(12) United States Patent
Liu et al.

(10) Patent No.: US 10,135,043 B2
(45) Date of Patent: Nov. 20, 2018

(54) BATTERY ASSEMBLY FOR ELECTRONIC DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Bang Liu, Shenzhen (CN); Bo Yang, Shenzhen (CN); Hai-Tao Wang, Shenzhen (CN); Bo-Duo Yuan, Shenzhen (CN); Ya-Dong Gao, Shenzhen (CN); Su-Na Chen, Shenzhen (CN); Xiao-Wei Zhang, Shenzhen (CN)

(73) Assignees: HONGFUJIN PRECISION ELECTRONICS (ZHENGZHOU), Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 354 days.

(21) Appl. No.: 14/687,618

(22) Filed: Apr. 15, 2015

(65) Prior Publication Data
US 2016/0164062 A1    Jun. 9, 2016

(30) Foreign Application Priority Data

Dec. 4, 2014   (CN) .......................... 2014 1 0726495

(51) Int. Cl.
*H01M 2/00* (2006.01)
*H01M 2/10* (2006.01)
*H01M 2/20* (2006.01)
*H01M 10/42* (2006.01)
*H01R 12/79* (2011.01)

(52) U.S. Cl.
CPC ........... *H01M 2/1022* (2013.01); *H01M 2/20* (2013.01); *H01M 10/425* (2013.01); *H01M 2220/30* (2013.01); *H01R 12/79* (2013.01)

(58) Field of Classification Search
CPC ....... H01M 2/20; H01M 2/204; H01M 10/425
See application file for complete search history.

(56) References Cited

U.S. PATENT DOCUMENTS

| | | | | |
|---|---|---|---|---|
| 5,473,242 A | * | 12/1995 | McKenna | H01M 2/1055 320/113 |
| 5,977,746 A | * | 11/1999 | Hershberger | H01M 2/1016 320/112 |
| 2007/0184341 A1 | * | 8/2007 | Yoon | H01M 2/0207 429/152 |
| 2008/0113262 A1 | * | 5/2008 | Phillips | H01M 2/105 429/149 |

(Continued)

*Primary Examiner* — Nicholas P D'Aniello
(74) *Attorney, Agent, or Firm* — ScienBiziP, P.C.

(57) ABSTRACT

A battery assembly for an electronic device includes a holding tray defining a receiving space for receiving a battery therein, a printed circuit board configured to electrically couple to the battery, and a casing defining a receiving chamber configured to receive the battery, the holding tray, and the printed circuit board therein. The casing is a housing of the electronic device. The battery includes a flexible printed circuit board. The battery electrically couples to the printed circuit board through the flexible printed circuit board.

10 Claims, 5 Drawing Sheets

(56) References Cited

U.S. PATENT DOCUMENTS

| | | | |
|---|---|---|---|
| 2010/0047676 A1* | 2/2010 | Park | H01M 2/105 429/93 |
| 2015/0188112 A1* | 7/2015 | Adre | G06F 1/188 361/679.55 |

* cited by examiner

BATTERY ASSEMBLY FOR ELECTRONIC DEVICE

FIELD

The subject matter herein generally relates to battery assemblies, and more particularly to a battery assembly that is easy to assemble in an electronic device.

BACKGROUND

Generally, portable electronic devices, such as mobile phones and tablet computers, include an internal battery to provide power for the electronic device. The internal battery may be electrically coupled to a printed circuit board of the electronic device by a board-to-board method or by a soldering method. The board-to-board method requires a board-to-board connector to connect the battery to the printed circuit board. The soldering method requires the battery to be soldered to the printed circuit board.

BRIEF DESCRIPTION OF THE DRAWINGS

Implementations of the present technology will now be described, by way of example only, with reference to the attached figures.

DETAILED DESCRIPTION

Figure 1:
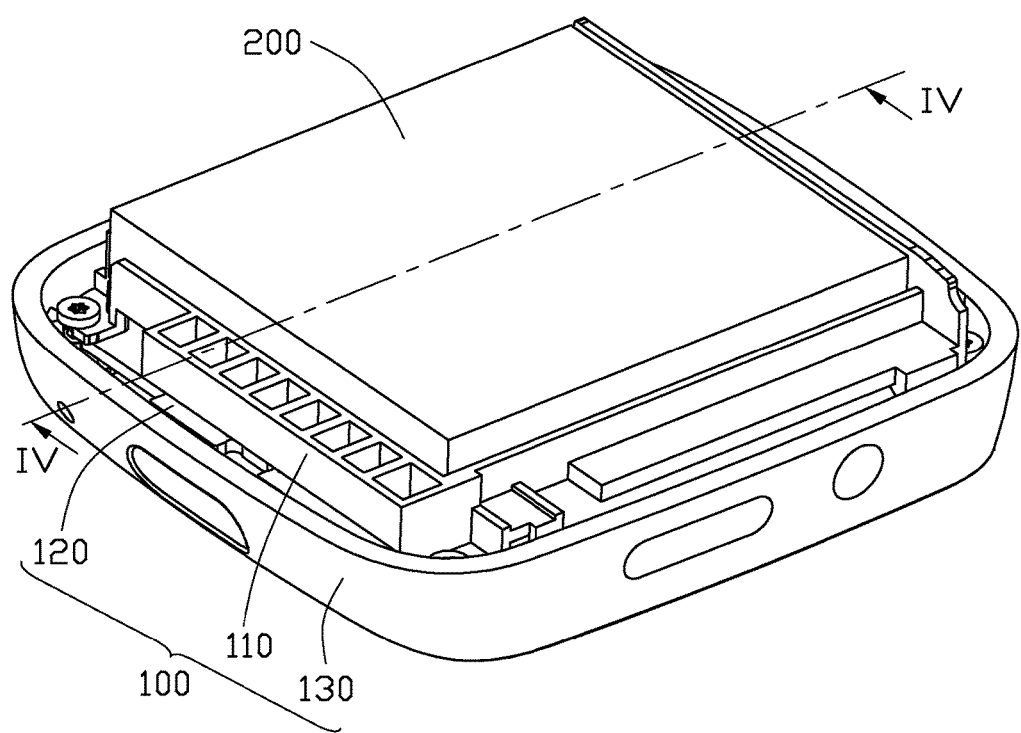
FIG. 1 is an assembled, isometric view of an embodiment of a battery assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a battery assembly 100. The battery assembly 100 may include a battery 200, a holding tray 110, a printed circuit board 120, and a casing 130. The holding tray 110 may receive the battery 200 therein. The battery 200, the holding tray 110, and the printed circuit board 120 may be received inside the casing 130. In at least one embodiment, the casing 130 may be a housing of an electronic device such as a mobile phone or a tablet computer.

Figure 2:
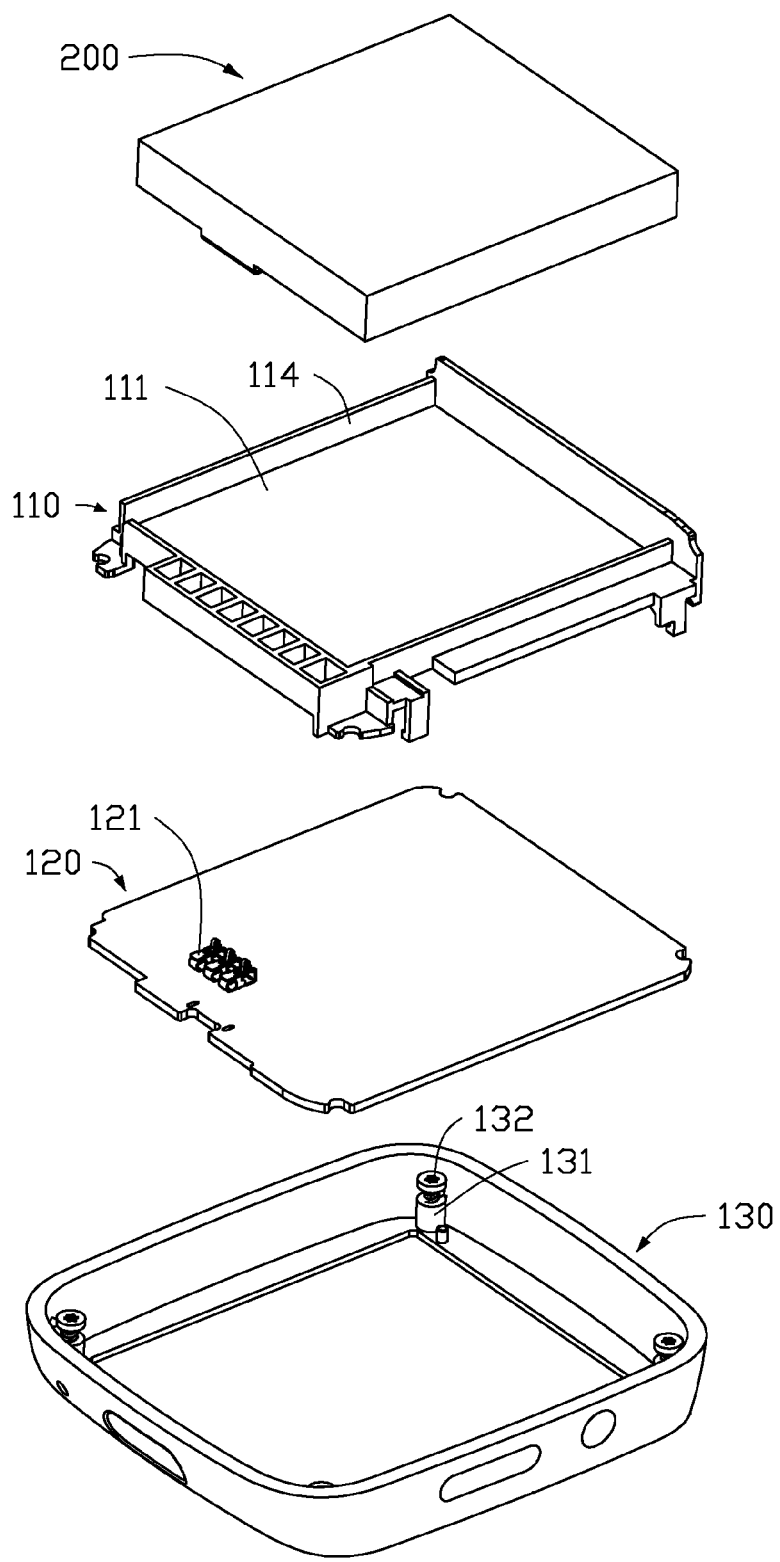
FIG. 2 is an exploded, isometric view of the battery assembly of FIG. 1.
Figure 3:
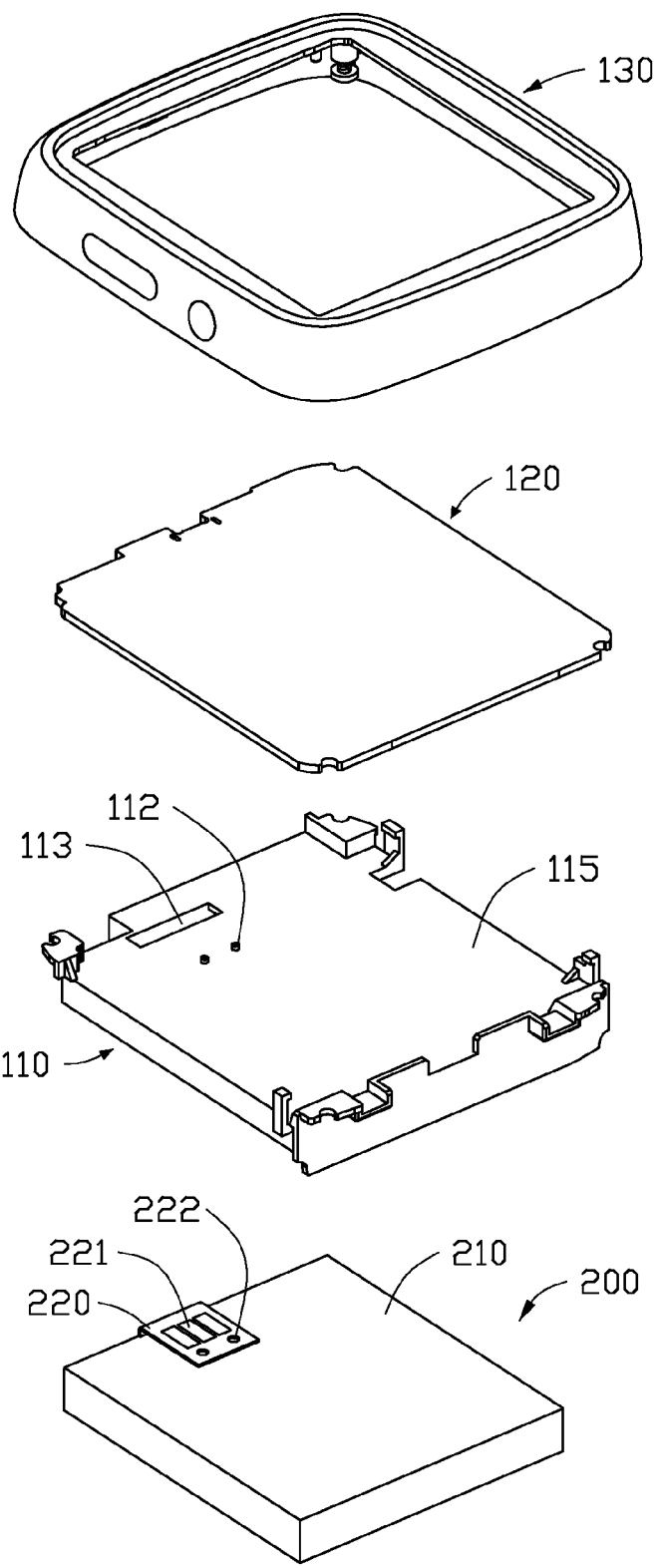
FIG. 3 is similar to FIG. 2, but viewed from a different angle.

Referring to FIGS. 2 and 3, the holding tray 110 may include a bottom wall 111 and a plurality of sidewalls 114. The bottom wall 111 may include a first surface (not labeled) and a second surface 115 opposite to the first surface. The battery 200 may be received in a receiving space (not labeled) cooperatively defined by the first surface of the bottom wall 111 and the plurality of sidewalls 114. The battery 200 may include a main body 210 and a flexible printed circuit board 220 extended from the main body 210. The flexible printed circuit board 220 may be electrically coupled to the main body 210. In at least one embodiment, the battery 200 may be secured inside the receiving space by a pressure sensitive adhesive applied between the main body 210 and the first surface of the bottom wall 111. The holding tray 110 may define a slot 113 through the first surface and the second surface 115 of the bottom wall 111. When the battery 200 is secured inside the receiving space, the flexible printed circuit board 220 may extend through the slot 113.

The flexible printed circuit board 220 may include at least one metal contact pin 221. The metal contact pin 221 may be electrically coupled to the main body 210 through the flexible printed circuit board 220. The printed circuit board 120 may include at least one spring contact 121. The spring contact 121 may be electrically coupled to the printed circuit board 120. When the flexible printed circuit board 220 extends through the slot 113, the metal contact pin 221 may contact the spring contact 121. Thus, the main body 210 of the battery 200 electrically couples to the printed circuit board 120 by the metal contact pin 221 of the flexible printed circuit board 220 contacting the spring contact 121.

The holding tray 110 may further include at least one securing post 112 protruded from the second surface 115. At least one securing hole 222 may be defined in a distal end portion of the flexible printed circuit board 220. When the flexible printed circuit board 220 extends through the slot 113, the flexible printed circuit board 220 may be secured to the second surface 115 by the at least one securing post 112 latching in the at least one securing hole 222.

The casing 130 may define a receiving chamber (not labeled) for receiving the battery 200, the holding tray 110, and the printed circuit board 120 therein. The casing 130 may include a plurality of mounting posts 131 located inside the receiving chamber. The plurality of mounting posts 131 may support the printed circuit board 120 thereon, and the printed circuit board 120 may be positioned between the mounting posts 131 and the holding tray 110. Each of a plurality of fixing members 132 may pass through the holding tray 110 and the printed circuit board 120 to engage in a corresponding mounting post 131 to fix the holding tray 110 and the printed circuit board 120 in the receiving chamber. In another embodiment, the holding tray 110 and the printed circuit board 120 may be fixed in the receiving chamber by a plurality of latching assemblies.

Figure 4:
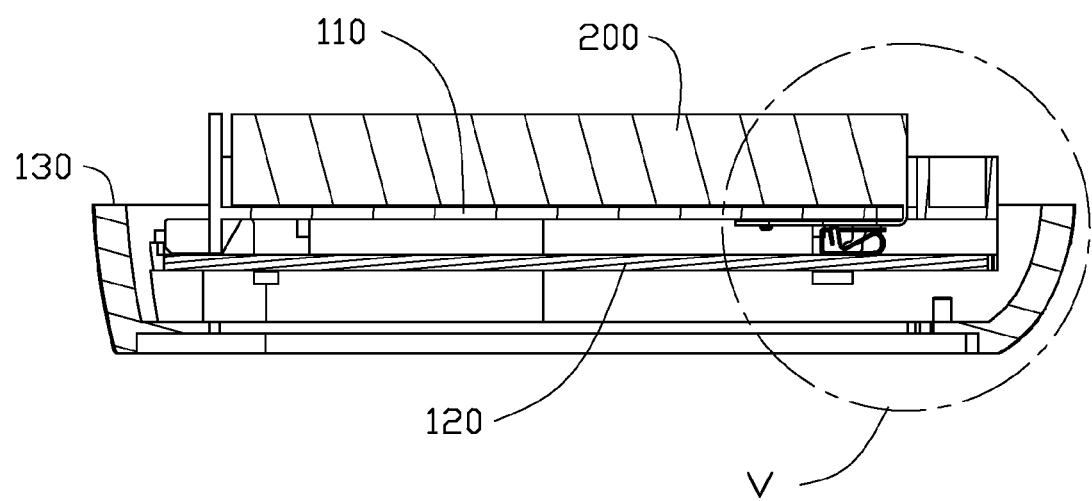
FIG. 4 is a cross-sectional view taken along line IV-IV of FIG. 1.
Figure 5:
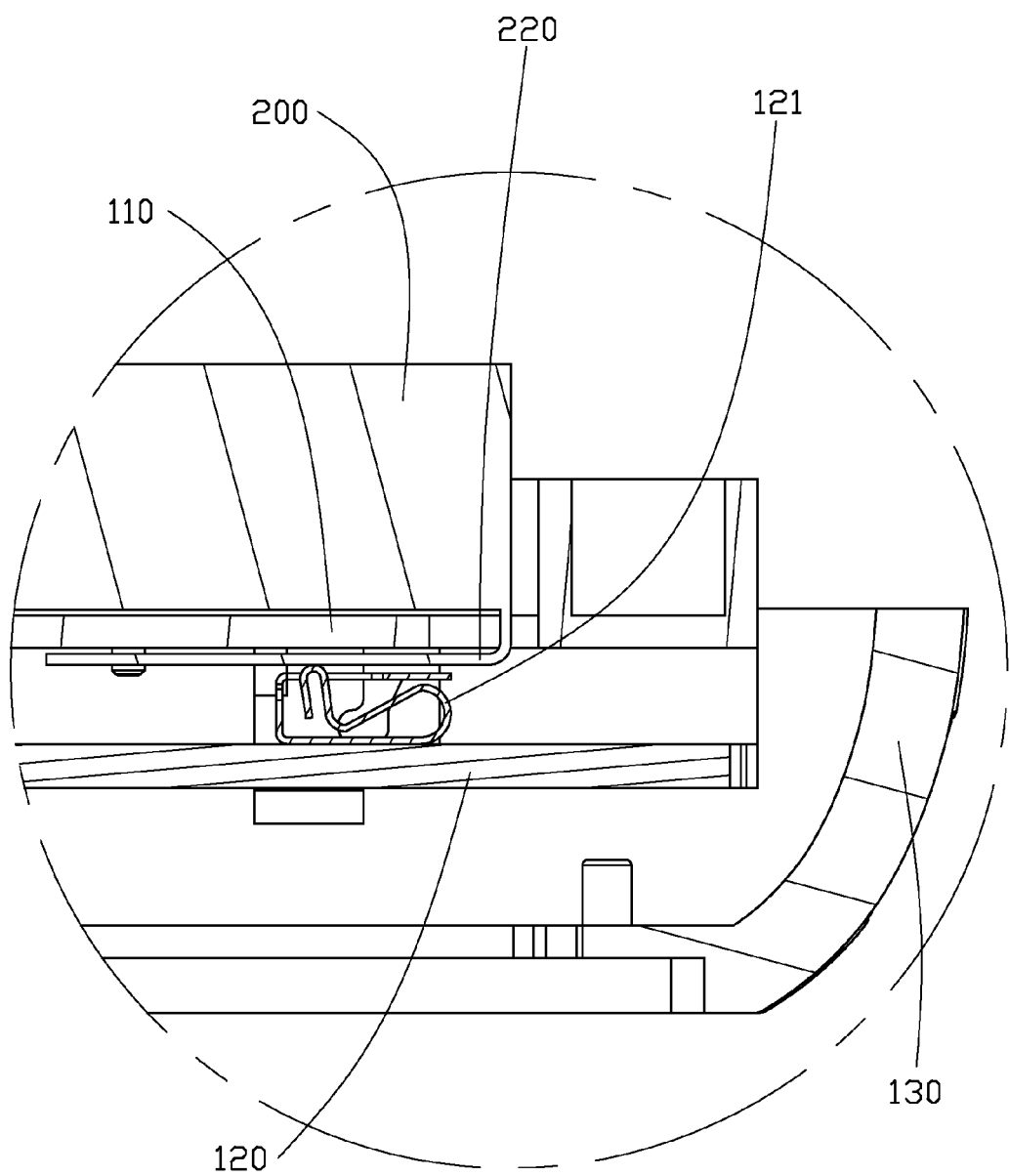
FIG. 5 is a close-up view of circled portion V of FIG. 4.

Referring to FIGS. 4 and 5, when the battery assembly 100 is assembled, the metal contact pin 221 of the flexible printed circuit board 220 contacts the spring contact 121 of the printed circuit board 120.

The battery assembly 100 is easy to assemble and has a simple design. Thus, the battery assembly 100 is practical for use in a wide range of electronic devices.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A battery assembly for an electronic device, comprising:
    a battery comprising a flexible printed circuit board extending therefrom;
    a printed circuit board comprising at least one spring contact directly thereon, each spring contact comprising a planar electrically conductive sheet; and
    a holding tray defining a receiving space for receiving the battery therein, the holding tray located between the battery and the printed circuit board;
    wherein the flexible printed circuit board extends through the holding tray to contact the at least one spring contact;
    the flexible printed circuit board, by contacting the at least one spring contact, electrically couples the battery to the printed circuit board; and
    the battery, the printed circuit board, and the holding tray received inside a casing of the electronic device.

2. The battery assembly of claim 1, the flexible printed circuit board extending from a main body of the battery.

3. The battery assembly of claim 2, the flexible printed circuit board comprising at least one metal contact pin; and the main body of the battery electrically couples to the printed circuit board by the at least one metal contact pin of the flexible printed circuit board contacting the at least one spring contact on the printed circuit board.

4. The battery assembly of claim 1, the holding tray defining a slot; and the flexible printed circuit board extending through the slot when the battery is received inside the receiving space.

5. The battery assembly of claim 4, the holding tray comprising a bottom wall and a plurality of sidewalls; the bottom wall comprising a first surface and a second surface, the first surface opposite to the second surface; the receiving space is cooperatively defined by the first surface of the bottom wall and the plurality of sidewalls; and the slot defined through the first surface and the second surface of the bottom wall.

6. The battery assembly of claim 5, the battery secured inside the receiving space by a pressure sensitive adhesive applied between the main body and the first surface of the bottom wall.

7. The battery assembly of claim 5, at least one securing hole is defined in a distal end portion of the flexible printed circuit board; the holding tray comprises at least one securing post protruding from the second surface; and the flexible printed circuit board secured to the second surface by the at least one securing post latching in the at least one securing hole.

8. The battery assembly of claim 1, the casing comprises a plurality of mounting posts located inside the receiving chamber; the printed circuit board is supported on the plurality of mounting posts; and the printed circuit board is positioned between the mounting posts and the holding tray having the battery received therein.

9. The battery assembly of claim 8, each of a plurality of fixing members passing through the holding tray and the printed circuit board for insertion into a corresponding one of the mounting posts; and the holding tray and the printed circuit board are fixed inside the receiving chamber of the casing by the plurality of fixing members inserted into the plurality of mounting posts.

10. The battery assembly of claim 1, the printed circuit board positioned between the holding tray and the casing; and the holding tray and the printed circuit board are fixed inside the receiving chamber of the casing by a plurality of latching assemblies.

* * * * *

UNITED STATES PATENT AND TRADEMARK OFFICE
CERTIFICATE OF CORRECTION

PATENT NO. : 10,135,043 B2
APPLICATION NO. : 14/687618
DATED : November 20, 2018
INVENTOR(S) : Bang Liu et al.

It is certified that error appears in the above-identified patent and that said Letters Patent is hereby corrected as shown below:

On the Title Page

Please replace item (73) regarding "Assignees" with the following:
(73) Assignees: HONGFUJIN PRECISION ELECTRONICS (ZHENGZHOU)
CO., LTD., Zhengzhou (CN);
HON HAI PRECISION INDUSTRY CO., LTD., New Taipei (TW)

Signed and Sealed this
Fifth Day of November, 2019

Andrei Iancu
*Director of the United States Patent and Trademark Office*